E. KEMPSHALL.
MANUFACTURE OF COMPOUND SHEET MATERIAL.
APPLICATION FILED JAN. 17, 1902.
964,524.
Patented July 19, 1910.
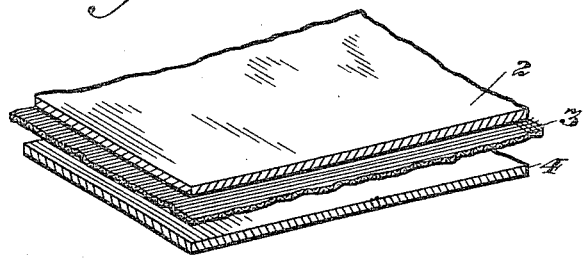
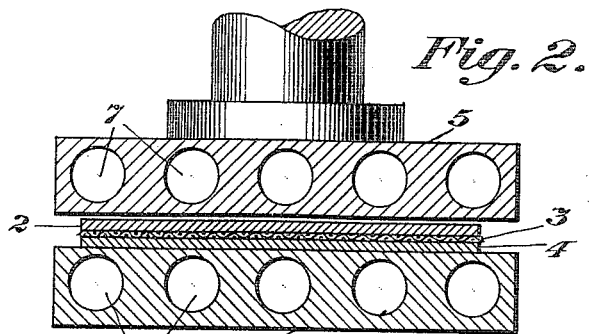
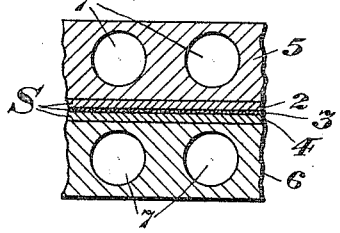
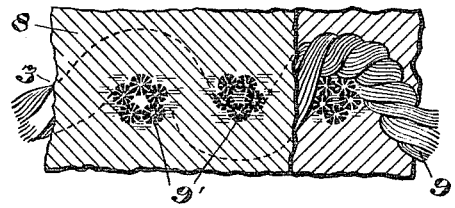
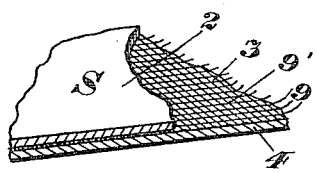
Witnesses;
R. W. Pittman
C. A. Jarvis.
Inventor,
Eleazer Kempshall,
By his Attorney,
F. H. Richards.

UNITED STATES PATENT OFFICE.

ELEAZER KEMPSHALL, OF BOSTON, MASSACHUSETTS, ASSIGNOR TO MANHATTAN MANUFACTURING COMPANY, OF PORTLAND, MAINE, A CORPORATION OF MAINE.

MANUFACTURE OF COMPOUND SHEET MATERIAL.

964,524.

Specification of Letters Patent. Patented July 19, 1910.

Application filed January 17, 1902. Serial No. 90,171.

*To all whom it may concern:*

Be it known that I, ELEAZER KEMPSHALL, a citizen of the United States, residing in Boston, in the county of Suffolk and State of Massachusetts, have invented certain new and useful Improvements in Manufacture of Compound Sheet Material, of which the following is a specification.

The present invention relates to a method of producing compound or composite material in the form of sheets or plates made by combining, under heat and pressure, one or more sheets or layers of material of the celluloid or pyroxylin class with a sheet of woven or other fabric.

The present method involves the use of celluloid or like material in a "green" or partially cured state and a principal feature of the invention resides in the incorporation with a fabric sheet of one or more sheets of celluloid which, while in a substantially solid condition, still retain, nevertheless, a small proportion of the solvent originally existing therein. According to this feature of the invention, during the manufacture of the celluloid and the formation of it into sheets, the larger part, although not all, of the solvent is eliminated, but the sheets are not allowed to become hard or fully cured. In the prior art, as I am advised, it has been the practice in manufacturing compound sheets of this general character to provide hard, fully cured celluloid sheets and treat them with a solvent in an attempt to bring them into proper condition for building up the compound sheet but, as is known to those familiar with this art, the celluloid will not under such treatment regain its original partially cured condition. An advantage of the present invention, therefore, is that the steps of completing the curing of the original celluloid sheets and of softening or re-dissolving them again are eliminated, and that therefore it becomes possible to produce the final compound sheet with a minimum impairment of its solidity as well as of its molding and working qualities.

A further feature of the invention relates to the preparation of the fabric sheet. As hereinafter specifically described, the meshes between the individual strands of the weft and warp of the woven fabric are thoroughly permeated by a celluloid material containing more solvent, and therefore being more plastic, than the outer celluloid sheets above mentioned, but preferably this material is of such consistency that it does not penetrate to the center of these strands but merely enters their outer surfaces so that it interlocks with the fibers upon such surfaces.

Further details of the invention will now be described in connection with the accompanying drawings in which—

Figures 1, 2 and 3 illustrate somewhat diagrammatically successive steps in the preferred manner of carrying out the manufacture of the compound material; Fig. 4 shows upon an enlarged scale and also diagrammatically the fabric sheet incorporated with celluloid material, and Fig. 5 shows a portion of the completed material with a part of one of the outer celluloid sheets broken away to show the intermediate fabric sheet.

In the drawings, 2 and 4 designate sheets of celluloid or like material from which the greater portion of the solvent employed in their manufacture has been eliminated. If these sheets are of considerable thickness, a proportionately greater amount of solvent should be eliminated. These sheets, therefore, as above explained, are in a partially cured condition intermediate their "green" condition and the condition which they would ultimately assume when fully cured.

3 indicates a woven fabric sheet, which may, if desired, be embedded between the outer or facing celluloid sheets without special treatment. Preferably, however, the fabric first has incorporated with it a celluloid substance 8 more plastic than that comprised in the outer sheets so as thoroughly to coat the individual strands of the fabric, penetrating the outer fibers of these strands so as to interlock therewith.

9 and 9' indicate respectively the strands of the warp and of the weft of the fabric.

As indicated in Fig. 4, the celluloid substance 8 is employed in such quantity as to extend slightly beyond the faces of the fabric itself.

After the sheets 2, 3 and 4 have been assembled they may be placed, as indicated in Fig. 2, between pressing and heating dies 5, 6, provided with passages 7 for heating or cooling fluids, such as are commonly employed in the manufacture of celluloid articles. The assembled sheets are thereupon subjected to a relatively high degree of heat and pressure applied simultaneously and thoroughly compacted in a manner indicated in Fig. 3 so as to produce a single, moldable, permanently united sheet, such as is shown at S, Fig. 5. By reason of the presence of a relatively large proportion of solvent in the sheet 3, this solvent acts upon the contiguous portions of the sheets 2 and 4 so that, after this treatment between the dies, all the sheets are closely united or inseparably welded together. This treatment is preferably carried to such an extent as to season and solidify the partially cured outer sheets 2 and 4, but preferably the treatment is terminated before the inner sheet 3 becomes fully cured, to the end that the interior of the compound sheet will remain comparatively ductile and flexible, thus adapting it for subsequent use in the production, by suitable dies, of articles of complex and irregular shapes.

Since for some purposes one of the sheets 2 or 4 may be omitted, the invention in its broader aspects is not limited to the employment of two outer sheets. Likewise, while it is preferable to treat the woven fabric preliminarily as above described before it is combined with the sheets 2 and 4, yet, as above suggested, the fabric might be used without such special treatment, in which case the outer sheets should contain somewhat more solvent so that the celluloid material may become thoroughly incorporated with the fabric.

The method above described produces a sheet material which is especially adapted for the production of articles, as for example the outer shells of golf balls, which, though requiring a high degree of elasticity and flexibility, are tough, durable and hard so that they may withstand repeated blows or other harsh treatment without cracking, abrasion or other serious injury and so that, if desired when so used, they will retain a smooth exterior finish.

It will be understood that the term celluloid as herein used is intended to include various compounds or derivatives of celluloid, cellonite, xylonite, collodion, pyrolin, pyroxylin, etc.

The novel material itself herein described is not claimed herein but has been made the subject-matter of a co-pending application filed December 16, 1901, which upon August 23, 1904, terminated in Patent No. 768,129.

Having described my invention, what I claim as new and desire to secure by Letters Patent of the United States is:—

1. A method of producing sheet material which consists in providing (a) a plurality of sheets of material of the celluloid or pyroxylin class, said sheets being free of the larger part of the solvent originally existing therein, and (b) an intermediate sheet comprising a fabric having incorporated with it such material containing a larger proportion of solvent and then combining the whole into a single concrete sheet under heat and pressure applied over all the exposed surfaces of the material.

2. A method of producing sheet material which consists in placing sheets of partially cured celluloid, largely free from the solvent employed in the manufacture thereof, upon the faces of a sheet of woven fabric having incorporated with it a more plastic celluloid substance and then combining the whole under heat and pressure into a single concrete sheet.

3. A method of producing sheet material which consists in incorporating an intermediate sheet of fabric by the aid of heat and pressure between sheets of material of the celluloid or pyroxylin class while the celluloid is in a solid but partially cured condition intermediate its "green" condition and the condition which it ultimately assumes when fully cured.

4. A method of producing sheet material which consists in embedding a sheet of fabric in the contiguous faces of sheets of celluloid or like material while the celluloid is in a solid but partially cured condition.

5. A method of producing sheet material which consists in eliminating from sheets of celluloid or like material the larger part but not all of the solvent employed in their manufacture, incorporating with the strands of a fabric sheet a quantity of celluloid substance in a somewhat plastic condition, placing said celluloid sheets upon the respective faces of said fabric sheet and then subjecting the whole to heat and pressure to produce a single concrete sheet.

6. A method of producing sheet material which consists in treating a sheet of fabric with "green" celluloid substance, applying to each face of the fabric sheet, so treated, a sheet of more thoroughly but yet only partially cured celluloid or like material and incorporating the whole under heat and pressure into a single moldable sheet.

7. A method of producing sheet material which consists in incorporating with the strands of a fabric sheet a sufficient quantity of celluloid substance in a somewhat plastic condition thoroughly to permeate the meshes thereof but to pass through the outer surface only of the strands without saturating them, then combining this fabric sheet under heat and pressure with a sheet of more thoroughly but yet only partially cured celluloid or like material thus producing a single flexible permanently compacted sheet.

ELEAZER KEMPSHALL.

Witnesses:
  B. C. STICKNEY,
  FRED. J. DOLE.